(12) United States Patent
Kumar

(10) Patent No.: US 7,999,403 B2
(45) Date of Patent: Aug. 16, 2011

(54) SYSTEM AND METHOD FOR LOCOMOTIVE ENGINE CRANKING

(75) Inventor: Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 423 days.

(21) Appl. No.: 12/144,796

(22) Filed: Jun. 24, 2008

(65) Prior Publication Data
US 2009/0315328 A1  Dec. 24, 2009

(51) Int. Cl.
*B60L 11/08* (2006.01)
(52) U.S. Cl. ........................................................ 290/1 R
(58) Field of Classification Search ....................... 290/1
See application file for complete search history.

(56) References Cited

U.S. PATENT DOCUMENTS

| | | | | |
|---|---|---|---|---|
| 2,374,060 A * | 4/1945 | Weybrew | ........................ | 290/16 |
| 2,447,654 A * | 8/1948 | Kenyon | .......................... | 318/6 |
| 2,501,360 A * | 3/1950 | Strong | ........................... | 290/10 |
| 2,645,293 A * | 7/1953 | Ogle et al. | ........................ | 416/28 |
| 4,616,166 A | 10/1986 | Cooper et al. | | |
| 5,068,590 A * | 11/1991 | Glennon et al. | ................ | 322/10 |
| 5,589,743 A * | 12/1996 | King | ............................. | 318/139 |
| 5,594,322 A * | 1/1997 | Rozman et al. | .................. | 322/10 |
| 6,023,137 A | 2/2000 | Kumar et al. | | |
| 7,281,509 B2 * | 10/2007 | Fukui et al. | ............. | 123/179.16 |
| 7,327,123 B2 * | 2/2008 | Faberman et al. | .............. | 322/37 |
| 2005/0052080 A1 * | 3/2005 | Maslov et al. | ............... | 307/10.1 |
| 2007/0084214 A1 * | 4/2007 | Schmidt et al. | ................. | 60/778 |
| 2008/0121136 A1 * | 5/2008 | Mari et al. | ....................... | 105/35 |
| 2009/0288893 A1 * | 11/2009 | Wyall et al. | ................ | 180/65.22 |
| 2010/0084207 A1 * | 4/2010 | Wyall | .......................... | 180/65.22 |
| 2010/0106343 A1 * | 4/2010 | Donnelly et al. | ............. | 700/295 |
| 2010/0164428 A1 * | 7/2010 | Xu et al. | ........................ | 318/767 |

FOREIGN PATENT DOCUMENTS

DE  102008062508 A1 *  7/2010

OTHER PUBLICATIONS

DE102008062508 Computer translation of Aug. 23, 2010.*

* cited by examiner

*Primary Examiner* — Joseph Waks
(74) *Attorney, Agent, or Firm* — Robert Wawrzyn; Alleman Hall McCoy Russell & Tuttle LLP

(57) ABSTRACT

In a method of operating a starting system coupled to a crankshaft of a vehicle engine, during engine starting, torque supplied by the starting system to the engine is continuously adjusted to provide more than two levels based on operating conditions of the vehicle or engine.

20 Claims, 9 Drawing Sheets

SYSTEM AND METHOD FOR LOCOMOTIVE ENGINE CRANKING

FIELD

The subject matter disclosed herein relates to systems and methods of improving engine cranking for locomotives.

BACKGROUND

Locomotives include various systems for cranking the engine in order to assist engine starting. The starting systems may utilize an engine starter motor, or other engine propulsion components. In one example, the propulsion system includes a battery that provides direct current (DC) power to an inverter that converts the DC power into a controlled frequency alternating current (AC) power. The AC power is then supplied to three-phase stator windings of an alternator that generates rotation of a rotor, which when coupled with the crankshaft of the engine, rotates the crankshaft for engine starting.

In U.S. Pat. No. 6,023,137, one such propulsion system is disclosed. In this example, a traction inverter converts battery DC to AC for alternator operation. After cranking, the traction inverter is reconnected to an AC traction motor that provides traction for the locomotive during engine running operation. The traction inverter is connected in series to the stator field winding and a field-shunting resistor. The shunting action is enabled only when a predetermined amount of time has elapsed after the commencement of cranking (e.g., engine speed is at least greater than 30 rpm), so that alternator torque can be readjusted to a higher value during a later part of the cranking. Load current is limited by battery voltage, back electromotive force (EMF) of the armature voltage, and circuit impedance, including that of the field winding. For example, the above system may perform cranking for battery voltages between 50V and 64V by effectively providing two discrete levels of alternator torque adjustment.

However, the inventors herein have recognized a potential issue with such an approach. For example, battery voltage and cranking torque specifications may vary significantly with the type of battery system, engine ratings (e.g., HP rating, rated engine speed), number of cylinders, fuel types, engine operating conditions, alternator design (e.g., armature inductance, resistance, field characteristics, and torque generation characteristics), environmental conditions, and/or system aging. Thus, even with two levels of alternator torque adjustment, degraded starting may occur under various situations, if the same configuration is applied to locomotives with different engine ratings, battery voltage, etc. Further, the limitation in alternator output adjustment may result in numerous starter electronics configurations, which can increase manufacturing complexity, repair complexity, etc.

BRIEF DESCRIPTION OF THE INVENTION

In one approach, the above issues may be addressed by a method of operating a starting system coupled to a crankshaft of a locomotive engine, comprising: during engine cranking, adjusting torque supplied by the starting system to the locomotive engine based on operating conditions, e.g., of the vehicle or engine, to provide more than two torque levels. Various approaches may be used to provide the adjusted torque to the engine, including adjusting a voltage boost of the battery voltage, operating a starter motor as an induction machine, providing separate excitation for an alternator field winding, and/or providing continuous field shunting of an alternator stator field winding. Further, in one example, the starting system torque may be adjusted continuously during the starting operation of the engine, including successive adjustments by a computer-controlled system to provide a variable torque profile over time that is based on the various engine or vehicle operating conditions during the engine start.

In this way, by providing such adjustment in supplied starting torque, more commonality in the starting system architectures may be used in locomotives of varying system design, thereby accommodating a range of engines, batteries, alternators, etc. Further, such an approach may accommodate variation and/or degradation of battery characteristics or engine characteristics or ambient conditions, at the same time providing efficient and reliable engine starting.

In one particular example, it may be possible to provide a desired torque trajectory based on the battery voltage and engine rating, and further responsive to real-time operating conditions. Thus, even as the system design and operating conditions vary, reliable starting may be achieved, possibly with reduced starting times.

BRIEF DESCRIPTION OF THE DRAWINGS

The present invention will be better understood from reading the following description of non-limiting embodiments, with reference to the attached drawings, wherein below.

DETAILED DESCRIPTION

A vehicle, such as a locomotive, may be designed for various markets of the global economy. The variety of markets can impact numerous features of the locomotive, including the battery systems, engine rating and size, fuel types, loads, etc. Further, markets evolve over time such that future conditions and designs can lead to yet more variation in system design, operation, and usage.

Engine cranking and starting in particular may be affected significantly by variation in battery systems, engine ratings, fuel types, loads, etc. As such, embodiments of the present invention provide for improved control of engine starting operation, including engine cranking torque, by enabling continuous variation/adjustment of cranking torque supplied to the engine. In one particular example, a common architecture can achieve such improved control, and be applied across a variety of battery systems, engines, fuel types, loads, etc.

A variety of approaches may be used to provide the desired control of torque levels. In a first embodiment, further described with regard to FIGS. 1-2, continuous field shunting of a three-phase alternator is achieved by continuously adjusting a field impedance via an insulated gate bipolar transistor (IGBT) during engine cranking. In this way, a desired speed profile during starting may be achieved independent from battery voltage, ambient conditions, fuel types, and/or engine characteristics.

Figure 4:
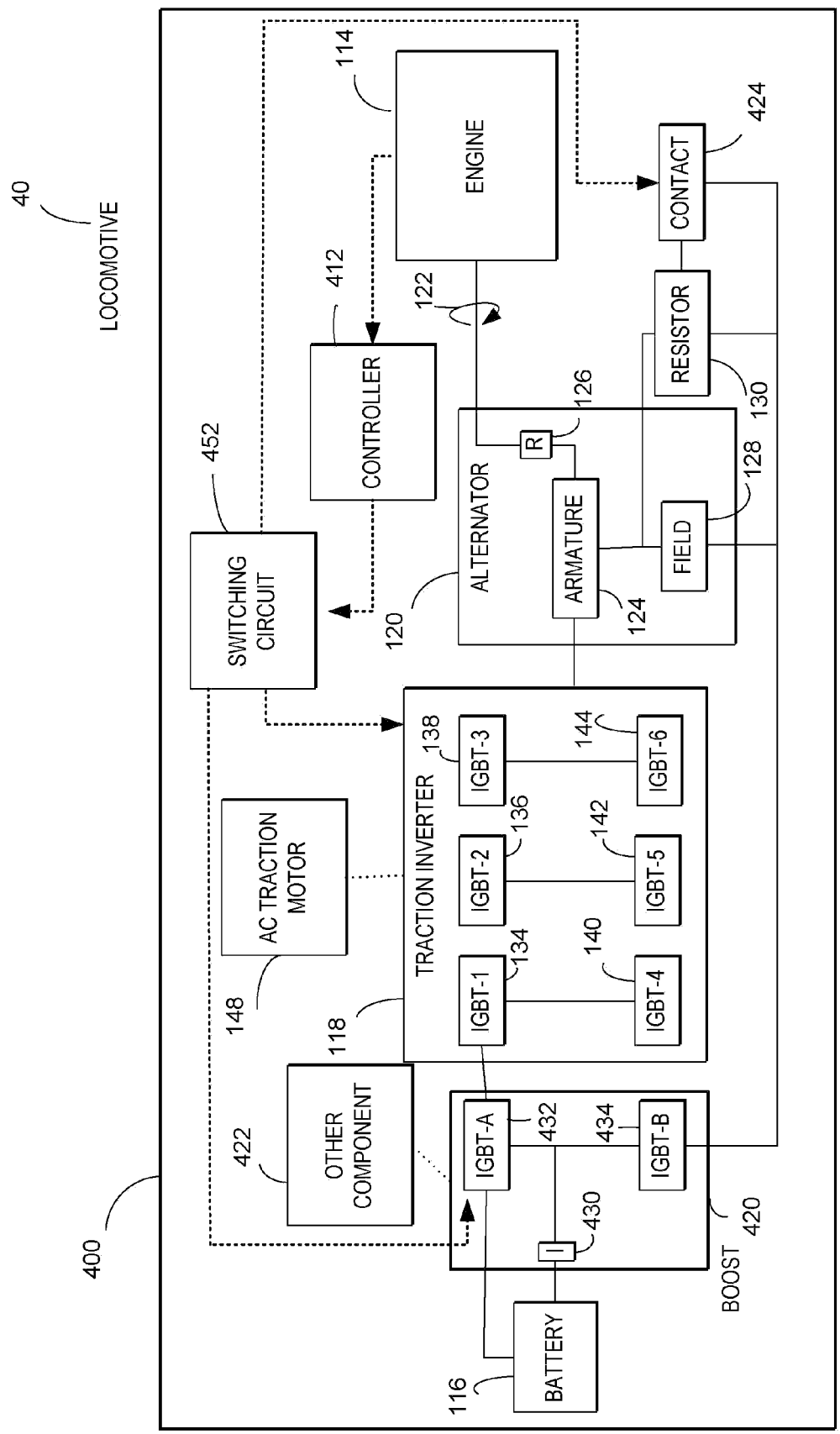
FIG. 4 depicts an example block diagram of an engine cranking system in a locomotive with a voltage boost.
Figure 5:
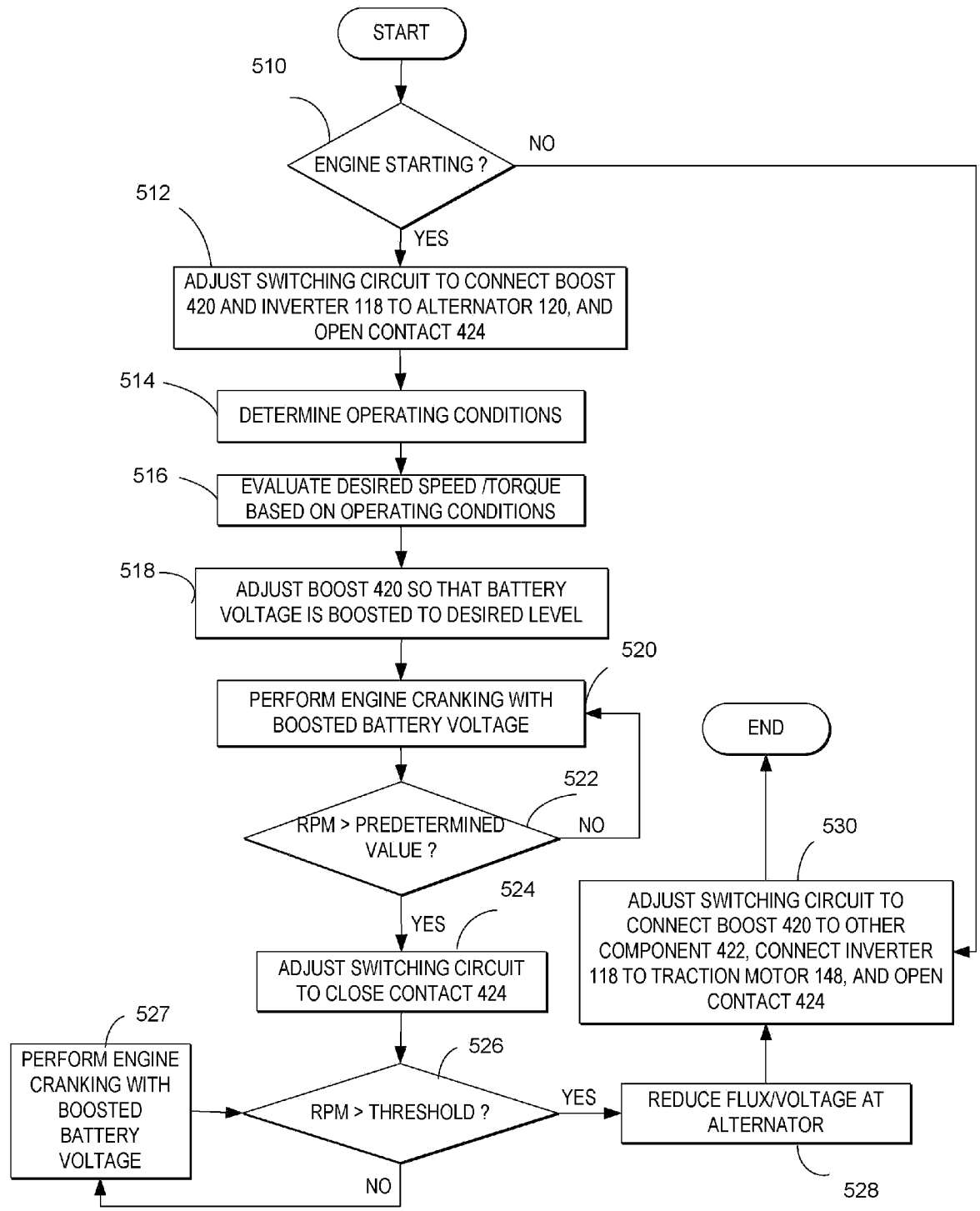
FIG. 5 depicts an example process flow for engine cranking with a voltage boost.

In a second embodiment, further described with regard to FIGS. 4-5, a DC supply (e.g., the battery) may be connected to at least one leg of a traction inverter, thus boosting the DC battery voltage. In this way, a desired speed profile during starting may be achieved independent from the battery voltage, battery degradation, or changing battery conditions.

Figure 6:
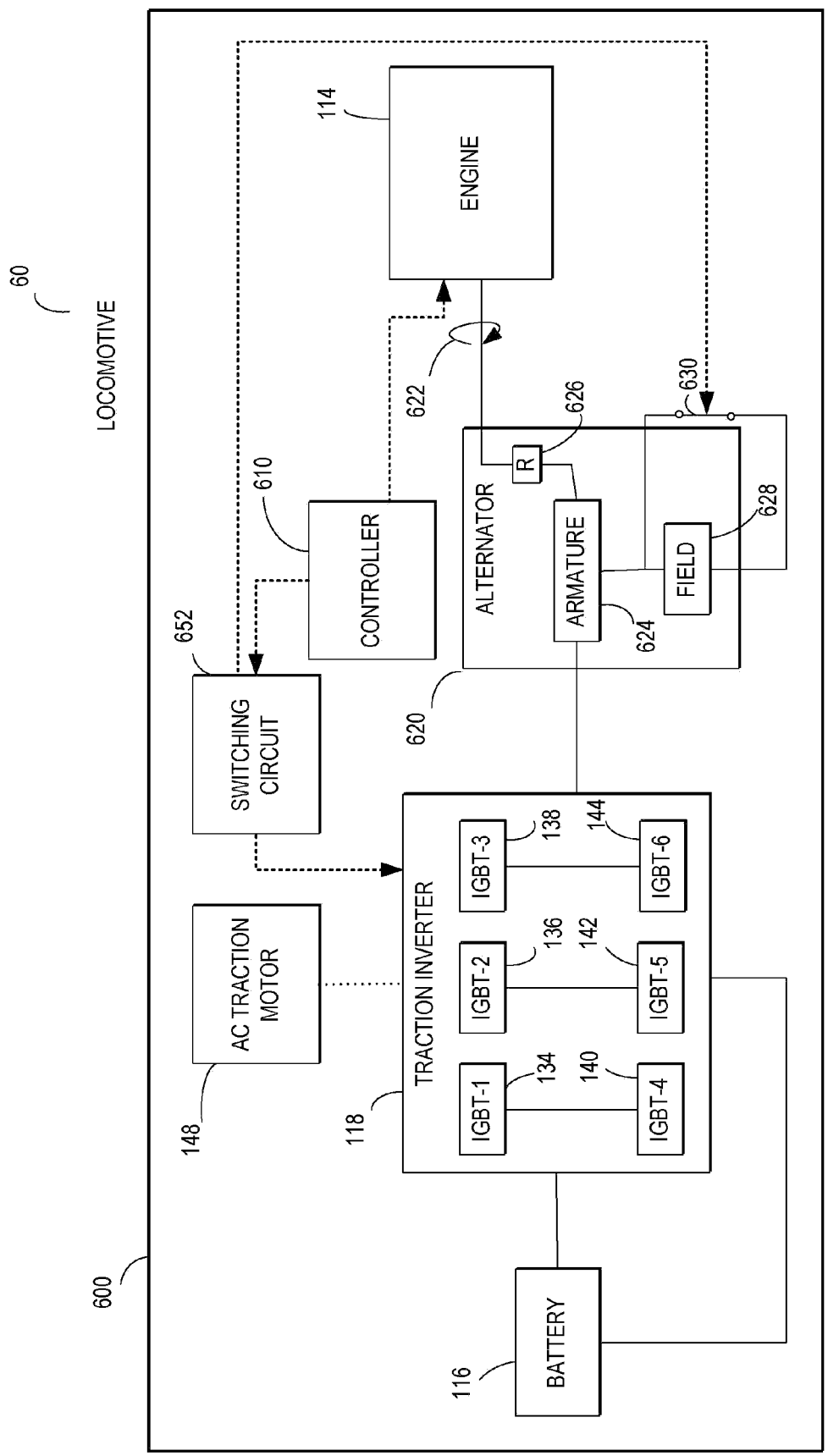
FIG. 6 depicts an example block diagram of an engine cranking system in a locomotive with a wound rotor.
Figure 7:
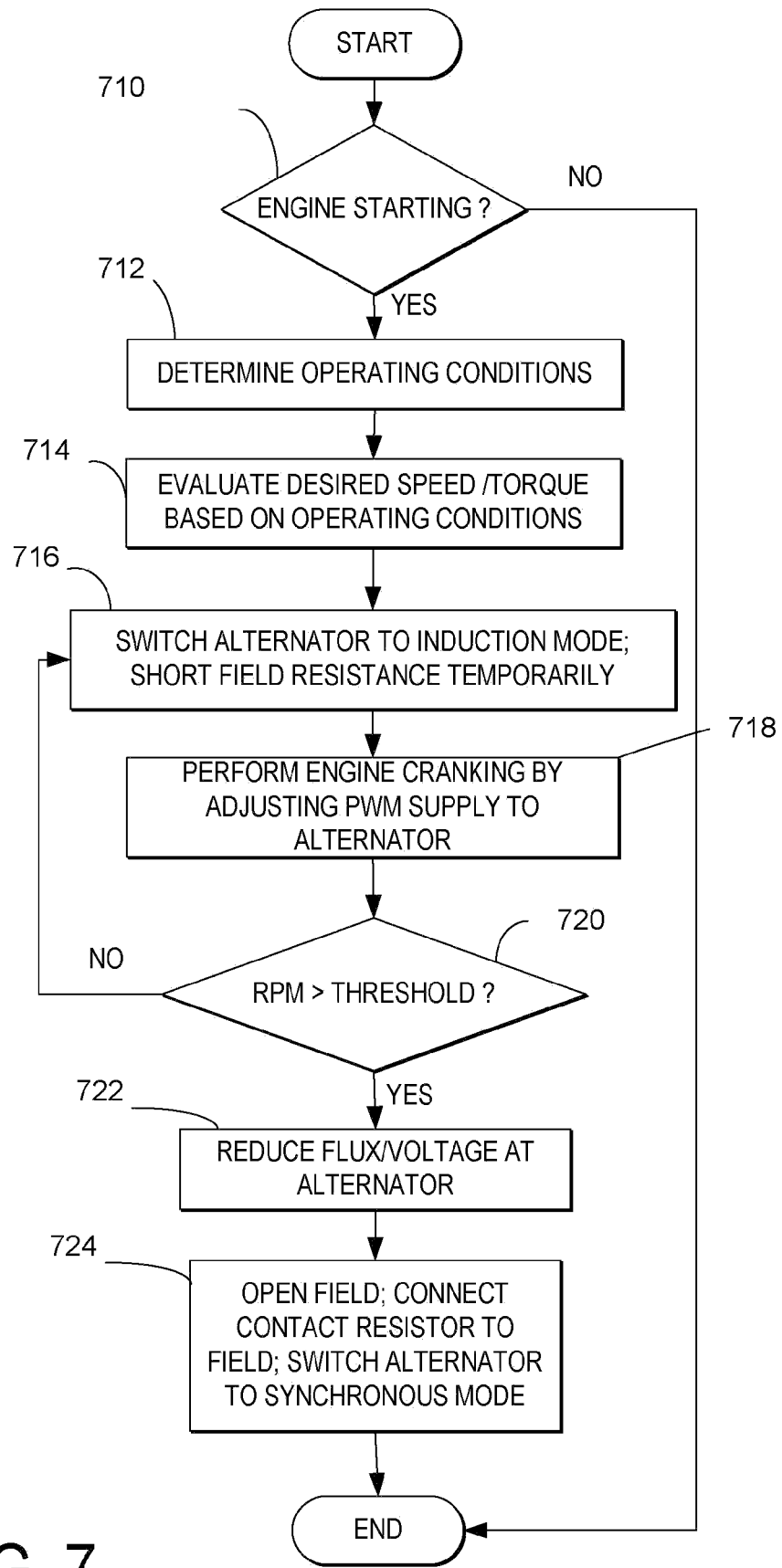
FIG. 7 depicts an example process flow for engine cranking with a wound rotor.

In a third embodiment, further described with regard to FIGS. 6-7, an alternator may be operated in an induction mode during cranking, and switched to synchronous mode after cranking. Again, such operation may enable a desired speed profile during starting to be achieved even with varying battery system operation, different engines, different fuels, etc.

Figure 8:
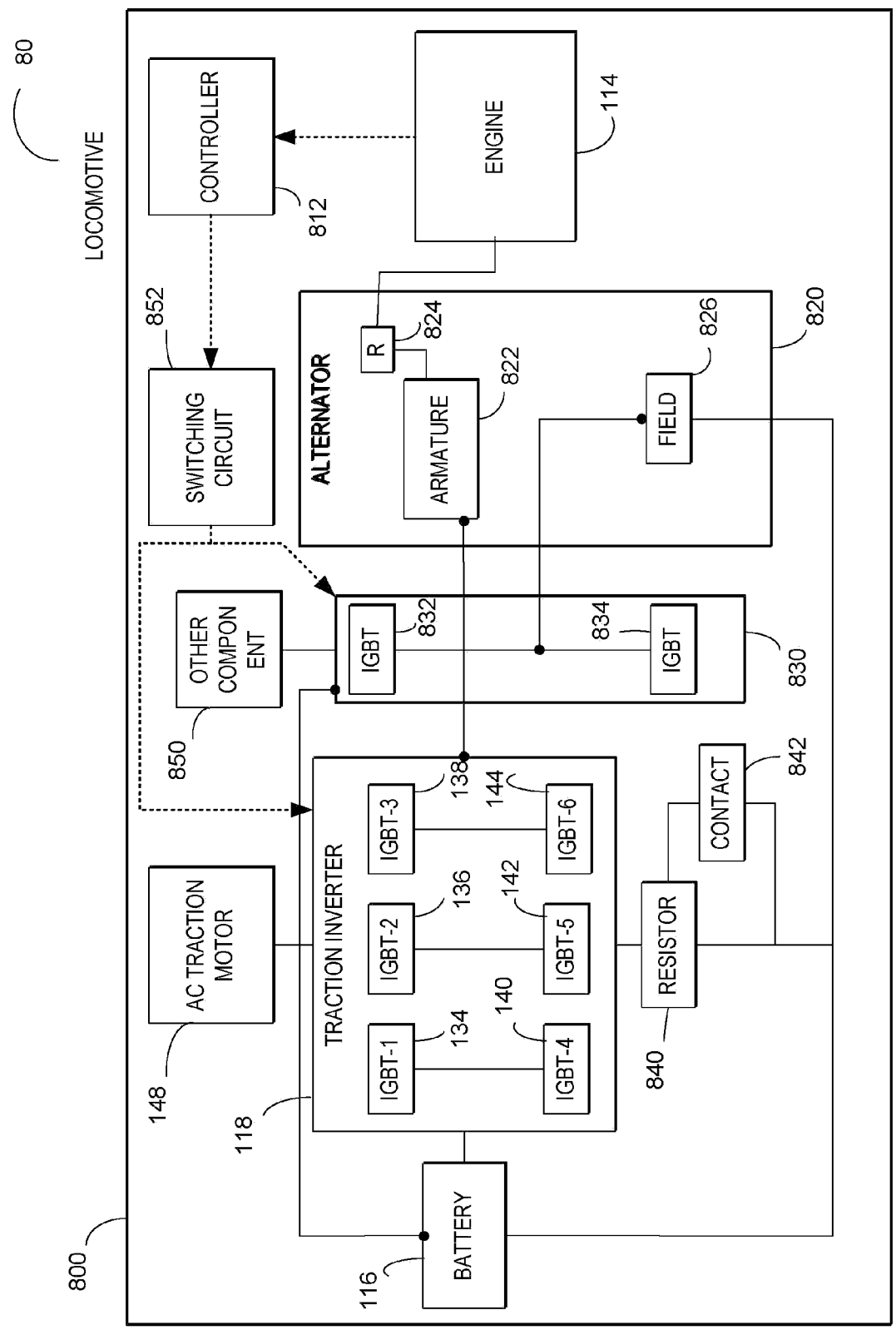
FIG. 8 depicts an example block diagram of an engine cranking system in a locomotive with a separate alternator field excitation.
Figure 9:
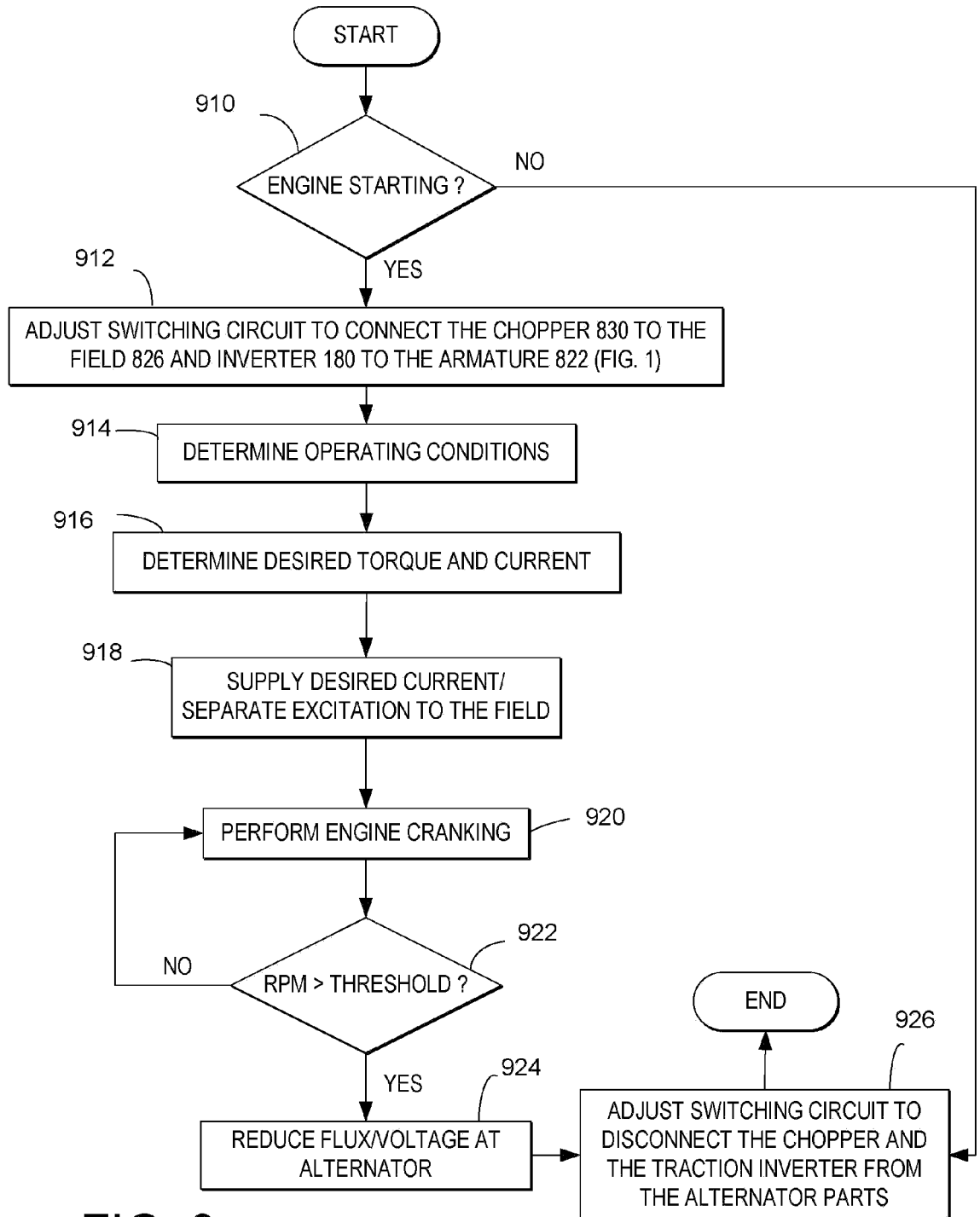
FIG. 9 depicts an example process flow for engine cranking with the separate field excitation.

In a fourth embodiment, further described with regard to FIGS. 8-9, a chopper/inverter may be coupled to an alternator field winding, thereby enabling a separate excitation of the field. Based on the desired torque to be generated, a corresponding excitation current may be supplied to the field. Again, such an operation may enable a desired speed profile to be achieved by continuous field weakening at the armature during cranking.

Figure 1:
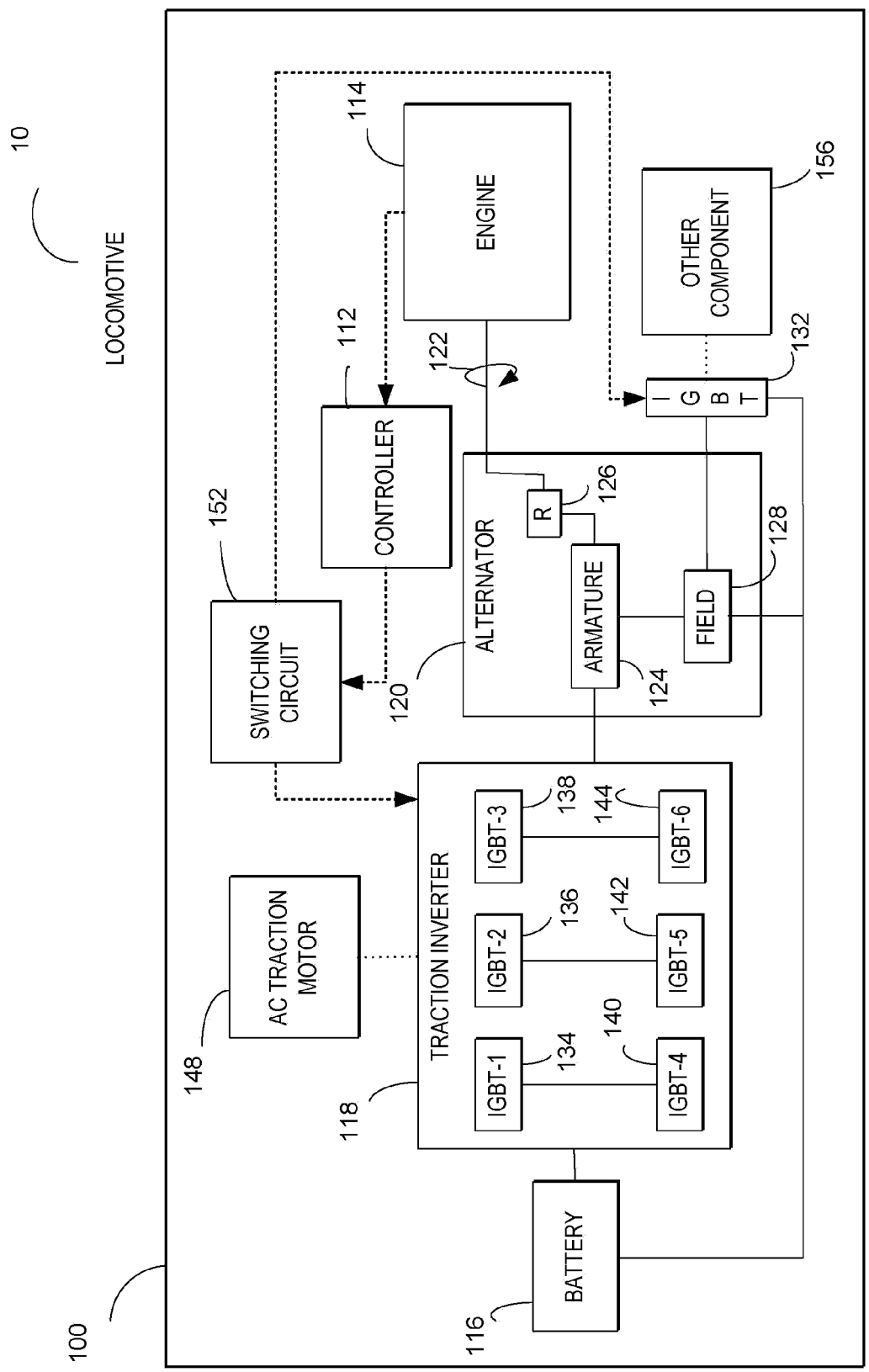
FIG. 1 depicts an example block diagram of an engine cranking system in a locomotive with a continuous field shunting.

Referring now to the drawings, like reference numerals are used to identify similar components in the various views. FIGS. 1, 4, and 6 refer to an engine cranking system with an electric storage battery 116, a traction inverter 118, an alternator 120 with an armature 124, a rotor ("R") 126, and field winding 128, and an engine 114.

Referring now specifically to FIG. 1, it shows the first embodiment of an engine cranking system 100 of a locomotive 10, which adjusts engine torque levels by continuous field shunting.

The cranking system 100 comprises a controller 112, a prime mover or engine 114, a heavy duty electric storage battery 116, a traction inverter 118, and a traction alternator 120. The heavy duty electric storage battery 116 supplies electrical energy for starting the engine 114. The engine 114 may be started by generating an alternator torque 122, which drives the crankshaft of the engine 114.

The heavy duty electric storage battery 116 may be a lead-acid or nickel-cadmium type, for example. The heavy duty electric storage battery 116 may provide an output voltage between 64 volts to 110 volts, depending on various parameters, including its state of charge, temperature, current draw, etc. The DC supplied by the heavy duty electric storage battery 116 is converted to AC supplied to the alternator 120 by the traction inverter 118. The traction inverter 118 comprises at least three legs, where each leg may include at least two IGBTs (e.g., as shown by parts 134, 136, 138, 140, 142, and 144). Out of the six IGBTs, at least two are open during circuit operation so that two phases are firing at a time.

In one example, the engine 114 may be a thermal or an internal-combustion engine such as a high horsepower, 16-cylinder diesel engine that is used to provide the motive power on a self-propelled diesel-electric traction vehicle such as a locomotive. In one example, the alternator 120 may perform two modes of operation: during engine cranking, the alternator 128 may be an AC motor that drives the crankshaft to start the engine 114; after engine cranking, the alternator may be a synchronous generator, which supplies alternating current to an electric load circuit that is connected to its armature winding 124.

In the engine starting mode of operation as shown in FIG. 1, the rotor "R" 126 of the alternator 120 drives the crankshaft of the engine 114. The electric energy supplied from the heavy duty electric storage battery 116 by the traction inverter 118 to the alternator 120 is converted into mechanical energy of the rotor 126. The rotor 126 thus exerts torque (122) to turn the crankshaft and thereby crank the engine. As the rotor "R" 126 accelerates, the engine speed (revolutions per minute, RPM) increases and the back EMF generated in the armature 124 correspondingly increases, while load current (e.g., current in the cranking circuit of FIG. 1) decreases in magnitude. Once the rotor is rotating faster than a predetermined rate, typically about 200 rpm, the engine is presumed to be started, and the engine cranking mode of operation is discontinued.

The load current in the circuit thus may directly depend on battery voltage, armature back EMF, and impedance in the circuit including that of the field. The alternator torque 122 generated as a result of accelerating the rotor "R" 126 depends primarily on the field resistance 128 and the back EMF of the alternator. Thus, by shunting the field resistance continuously, it may be possible to adjust alternator torque in real time, and in response to various operating conditions. For example, real time control in a computer controlled system may include repeated and successive adjustment of alternator torque by the system in response to calculations and sensor readings taken throughout operation.

In one example, the continuous field shunting is achieved by connecting an IGBT 132 in parallel to the field 128. The IGBT 132 may be additionally and selectively coupled to, and control, another component 156 of the locomotive. The other component 156 may include one or more of the following: a radiator fan, an air compressor, a battery charger, a traction field regulator, or an AC traction motor. In this manner, it is possible to utilize an IGBT to provide control of both the field 128, and thus the alternator 120, during cranking, as well as another component that does not operate during cranking, but operates before or after cranking, such as during locomotive running conditions.

Figure 2:
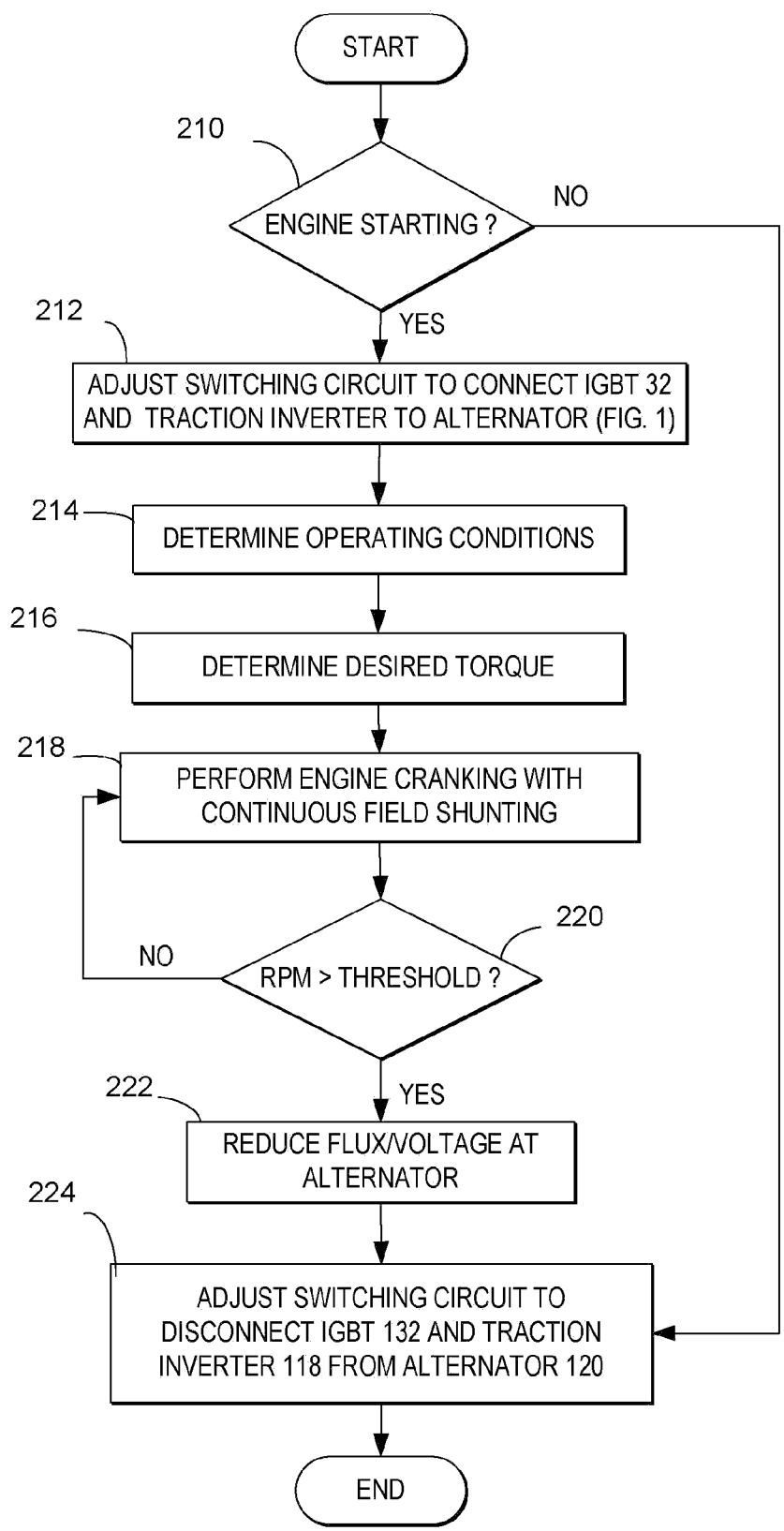
FIG. 2 depicts an example process flow for engine cranking with a continuous field shunting.

In one example, IGBT 132 may be controlled by controller 112 in response to a desired output torque, a desired speed trajectory, an actual engine speed, and/or various other parameters, as described in further detail herein with regard to FIG. 2. For example, based on a comparison of the actual torque and the desired torque, IGBT 132 generates a pulse width modulated (PWM) signal to continuously shunt the field 128 via modulating the impedance of the field. In another example, the IGBT 132 may modulate the impedance of a resistor connected in parallel to the field. Thus, torque supplied by a three-phase alternator 120 in the starting system may be adjusted in more than two levels (e.g., 3 or more torque levels) via continuous adjustment of field shunting of the alternator.

It may be noted that adjustment of torque among a plurality of levels may also be achieved by connecting a series of resistors in parallel to the field winding, with each of the resistors controlled by a switch. As multiple resistors are connected in parallel to the field, it results in further field weakening and consequently a higher alternator torque. The multiple switches may be in an on-state or an off-state at different times, as adjusted by the controller, in turn allowing a plurality of torque levels during engine cranking.

As noted above, the traction inverter 118 and the IGBT 132 may be used to control and power the alternator 120 during cranking, and may also be used to control and power the other component 156 of the locomotive 10 after engine cranking, such as during locomotive running conditions, for example. Thus, once the engine speed has reached about 200 rpm, for example, and the engine cylinders are firing, the controller 112 identifies the completion of cranking and sends signals to a switching circuit 152 to connect the traction inverter 118 to the AC traction motor 148, and the IGBT 132 to the other component 156, during subsequent engine operation. Dotted lines 146 and 154 show the alternate connections of the inverter 118 and the IGBT 132 to the traction motor 148 and the other component 156.

Thus, FIG. 1 depicts an example block diagram of an engine cranking system of a locomotive with continuous field shunting.

FIG. 2 depicts an example process flow of engine cranking with continuous field shunting. At 210, the controller 112 determines whether the engine is in a starting mode, such as a cranking mode. For example, the engine 114 may be already running, or it may be shut down. When the engine is not in the starting or cranking mode, the traction inverter 118 is connected to the AC traction motor 148, and the IGBT 132 is connected to the other component 156. Otherwise, at 212, the IGBT 132 and the traction inverter 132 are connected to the alternator 120. In one example, when the engine 114 is in the cranking mode, the controller 112 sends a signal to the switching circuit 152 to connect the inverter 118 and the IGBT 132 alternately to the cranking circuit as shown in FIG. 1.

At 214, various operating conditions may be determined. Operating conditions may include, one or more of the following: battery system conditions (voltage, current load, temperature), engine ratings (e.g., HP rating, rated engine speed), number of cylinders, fuel type, engine operating conditions (engine speed, engine airflow, and engine temperature), alternator characteristics environmental conditions, and/or system aging.

At 216, desired alternator torque is determined. For example, the desired alternator torque is based on the engine speed, battery voltage, alternator characteristics, and/or number of cylinders as determined at 212. In one example, the routine utilizes a desired engine speed trajectory during cranking and run-up, and based on an error between the desired trajectory and the actual engine speed trajectory, the desired alternator torque may be determined and used for controlling the field.

At 218, continuous adjustment of field shunting and engine cranking torque is performed. In one example, based on the engine speed error or rate of change of speed error or power output of the battery, etc., the controller 112 adjusts a PWM signal to the IGBT 132 to adjust the field shunting resistance.

At 220, an engine speed check is performed. In one example, if the engine speed has reached a predetermined speed, for example about 200 rpm, the controller signals that the engine 114 has completed cranking and the alternator torque supplied to the engine 114 is reduced. If the engine speed is below the predetermined speed, then the engine cranking continues as explained at 218.

At 222, voltage at the alternator is reduced. For example, once cranking is complete, the DC power supply from battery is shut down. Further, the alternator torque may not be generated, and the alternator may be switched to an idle or generating mode depending on operating conditions of the locomotive.

At 224, the IGBT 132 may be connected to the other component 156, and traction inverter 118 may be connected to the AC traction motor 148. Thus, upon the completion of engine cranking, the switching circuit may control the IGBT 132 and the traction inverter 118 so that they are connected to their corresponding parts during further engine operation.

In this manner, the routine provides continuous variation of the alternator torque level supplied to the engine in real-time. Such operation provides for variation of alternator torque among a plurality of torque levels, such as shown in FIG. 3, thereby generating a desired engine speed starting profile and improved engine starting operation.

In one particular example, a common control and electrical architecture can be applied to each of a 10 cylinder engine and a 16 cylinder engine. The difference in cranking torque requirements among these different architectures can be provided by the control system using the continuous field adjustment.

Figure 3:
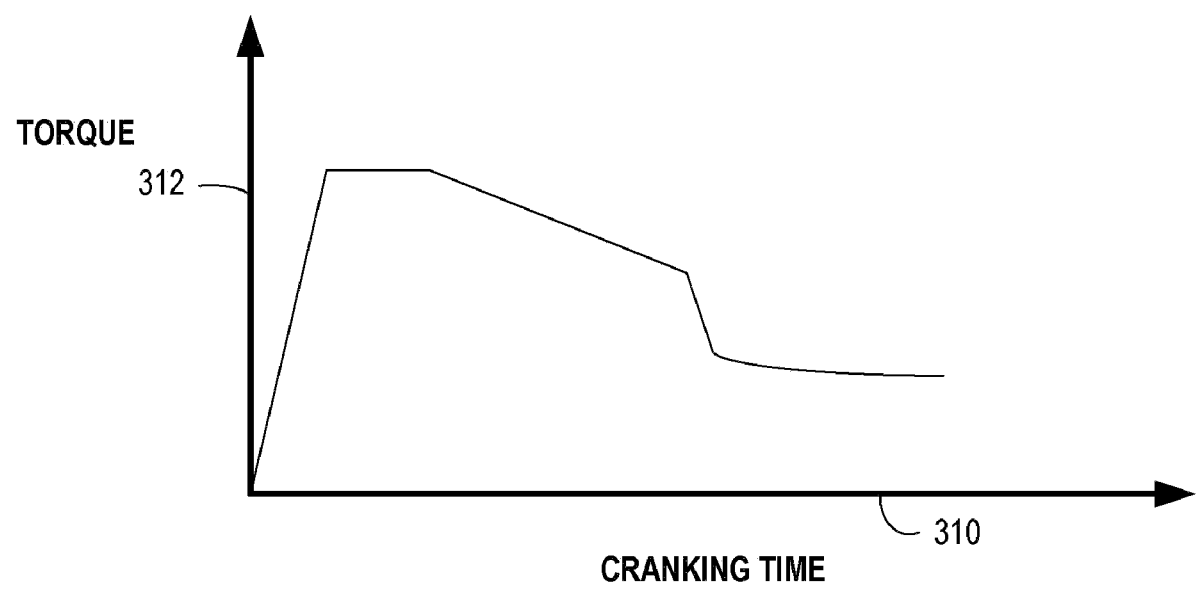
FIG. 3 illustrates graphically the variation of alternator torque with cranking time.

Referring specifically to FIG. 3, it figuratively depicts an example torque profile of the alternator torque generated during engine cranking. The horizontal axis 310 represents cranking time, and the vertical axis 312 represents alternator torque. As shown, the alternator torque may be repeatedly and continuously adjusted to maintain a desired cranking trajectory and thereby provide a plurality of cranking torque levels over time.

FIG. 4 shows a second embodiment of an engine cranking system 400 of a locomotive 40, which controls engine torque levels by providing a voltage boost 420. Specifically, FIG. 4 shows a system similar to that of FIG. 1, but with some additional components including a controller 412, a DC voltage boosting component ("boost") 420, an other component 422, and a switch 424. Other component 422 may include various locomotive components, such as noted herein with regard to 156.

Controller 412 may be the same as the controller 112 in FIG. 1, or it may be different. For example, the controller 412 in FIG. 4 additionally communicates with the switch 424, which selectively closes or opens the field shunting circuit.

In the engine cranking system 40, for example, a field resistance is connected to the shunting resistor via the switch 424, which may be open at the beginning of cranking, and may be closed when the engine 114 has reached a predetermined RPM (~30 RPM), depending on the engine operating conditions. Such a configuration provides two levels of alternator torque control via the field. However, as described herein, additional continuous alternator torque level control is provided by adjusting the battery voltage boost 420.

In one example, the battery 116 is connected to the boost 420, wherein the boost 420 may be at least one IGBT or at least one leg of a traction inverter. The boost 420 may additionally and selectively be coupled to, and control, the other components 422 of the locomotive. The other component may include one or more of the following: a radiator fan, an air compressor, a battery charger, a traction field regulator, or AC traction motor. In this manner, it is possible to utilize an existing component to provide boosting of the battery 116 during cranking, and control of another component after cranking. Specifically, because the component does not operate during cranking, but operates before or after cranking, such as during locomotive running conditions, both functions are maintained. In one example, the available DC voltage may be increased to a higher value (e.g., 110 volts).

In one example, if the battery is discharged to a lower value due to aging, or if a different battery with alternate voltage characteristics is used in the engine, the cranking may still be performed at a desired battery voltage by providing the cranking circuit with the voltage boost.

The voltage boost 420 may be a step-up converter, wherein the boost is formed with an inductor winding 430 coupled to at least one leg of a traction inverter (e.g., IGBTs 432 and 434). In one example, the inductor 430 may be one of the components of the vehicle, including a traction motor winding or a battery charger filter winding, etc., which may be in an idle mode during the engine cranking operation. During an on-state of the IGBT 432, inductor current increases with battery input voltage, and during an on-state of IGBT 434, the inductor current flows through the rest of the cranking circuit, transferring the energy accumulated during the on-state of IGBT 432, thus providing a boosted voltage. It should be understood by one skilled in this art, in view of this disclosure, how the voltage step-up may be achieved in this manner. Additionally, output voltage supplied to the cranking circuit may be monitored through the actual alternator torque generated 122, and by comparing the desired torque with the actual torque. In one example, the IGBTs 432 and 434 are adjusted so that the DC voltage supplied to the alternative may be adjusted continuously and/or repeatedly among a plurality of levels in real-time.

In another example, the voltage adjustment may be configured to reduce the voltage when the current battery voltage is too high.

It should be noted that voltage boosting may be achieved in various other ways, for example using linear regulators, or switching regulators that regulate battery voltage in response to a decrease in battery output.

FIG. 1 and FIG. 4 respectively show continuous field shunting capability and voltage boosting capability independently in two separate cranking systems. However, it should be noted that both continuous field shunting and voltage boosting may be used in tandem within one cranking system. For example, boosting component 420 may be connected to the battery as shown in FIG. 4; at the same time IGBT 132 may be connected to field resistance 128 as shown in FIG. 1, so that both features are incorporated in one cranking system.

FIG. 5 depicts an example process flow of an engine starting routine with voltage boosting capability. At 510, the controller 412 determines whether the engine is in a starting mode, such as a cranking mode. For example, the engine may be already running, or it may be shut down. In one example, when the engine is running, the routine continues to 530. At 530, the traction inverter 118 is connected to the AC traction motor 148, the boosting component 420 is connected to the other component 422, and the switch 424 is maintained open.

At 512, a switching circuit 452 is adjusted to connect corresponding components to the alternator 120. In one example, when engine 114 is in the cranking mode, the controller 412 may send out signal(s) to the switching circuit 452 to connect the boost 420 to the battery at one end and the alternator 120 at the other, and the traction inverter 118 to the alternator 120 of the cranking circuit, and to keep the switch 424 open.

At 514, various operating conditions may be determined. Operating conditions may include one or more of the following: battery system conditions (voltage, current load, temperature), alternator characteristics, engine ratings (e.g., HP rating, rated engine speed), number of cylinders, fuel type, engine operating conditions (e.g., engine speed, engine airflow, and engine temperature), environmental conditions, and/or system aging.

At 516, the desired level of alternator torque is determined. For example, the desired alternator torque may be based on the engine speed, battery voltage, and number of cylinders as determined at 514. In one example, the routine may utilize a desired engine speed trajectory during cranking and run-up, and based on an error between the desired trajectory and the actual engine speed trajectory, a desired battery voltage to achieve the desired torque may be evaluated.

At 518, continuous adjustment of voltage boost is performed. In one example, based on the engine speed error, the controller 412 sends a signal to the boost 420 to adjust the battery voltage to the desired value as evaluated at 516. The boost 420 may increase the battery voltage to a predetermined value, and in another example, the boost 420 may reduce the battery voltage to a predetermined value.

At 520, engine cranking is commenced. For example, with the boosted voltage passing through the cranking circuit, the load current is generated, the alternator torque increases, and as a result, engine speed increases.

At 522, a first engine speed check is performed. In one example, if the engine speed has reached a predetermined speed, for example about 30 rpm, the cranking circuit may desire a lower circuit impedance to maintain the desired load current, and therefore the controller 412 may send a signal to the switching circuit 452 to close the switch 424 and weaken the field 128 via resistor 130.

At 524, the switch 424 is closed. In one example, when cranking mode of operation commences, and the switch 424 is open, the load current may be limited by integral resistance of the battery 116 and the field resistance 128. As cranking proceeds and RPM increases, the alternator back EMF limits the load current. Thus, the load current and the torque tend to decrease with increasing speed. A short time after cranking begins, for example when RPM reaches about 30, closing the switch 424 weakens field resistance with 128, thereby permitting more load current to flow and higher torque to be developed.

At 526, a second RPM check is performed. In one example, if engine speed has reached a predetermined speed, for example about 200 rpm, the controller signals that the engine 114 has completed cranking, and the alternator torque 122 supplied to the engine 114 may be reduced. If the engine speed is below the predetermined speed, then the engine cranking may continue until the predetermined speed is reached, as at 527.

At 528, voltage at the alternator is reduced. For example, once cranking is complete, the DC power supply from the battery is shut down. Further, alternator torque may not be produced from battery power, and the alternator may be switched to generating mode.

At 530, the boost 420 may be connected to the other component 422, the traction inverter 118 may be connected to the AC traction motor 148, and the switch 424 may be opened. For example, when engine cranking is complete, the switching circuit controls the boost 420 and the traction inverter 118 so that they are connected to their corresponding parts during further engine operation, and the switch 424 is kept open so that field impedance is not shunted for further alternator operation.

FIG. 5 shows an example process flow of engine cranking with voltage boosting. As explained above, voltage boosting can enable the desired variation in alternator torque among a plurality of torque levels during an engine cranking operation.

FIG. 6 shows a third embodiment of an engine cranking system 600 in a locomotive 60. In this embodiment, a method of controlling engine torque levels through adjustment of a wound rotor is described. Specifically, FIG. 6 shows a system similar to that of FIG. 1, including the battery 116, the traction inverter 118, the AC traction motor 148, and the engine 114. FIG. 6 additionally includes a wound rotor alternator 620 with an armature 624, a rotor ("R") 626, and a field 628, a switching circuit 652, a controller 612, and a switch 630. The switching circuit may be similar to the switching circuit 152 in FIG. 1, and the controller 612 may be similar to the controller 112 in FIG. 1.

The alternator 620 may have a wound rotor 626 that enables the alternator to selectively function as an induction machine during a first operating condition, and as a synchronous machine during a second operating condition. In one example, during engine cranking, the alternator is operated as an induction machine, and then during other vehicle running conditions, the alternator is operated as a synchronous machine. The selective operation of the alternator may be achieved in a variety of ways.

In one example, a sufficiently high frequency PWM signal is passed on to the alternator field windings 628. The PWM signal generates a magnetic field at the armature 624, which, when swept past the rotor windings (wound rotor) 626, induces a current in the rotor 626, which enables the rotor 626 to rotate the crankshaft of the engine.

During the engine cranking duration, the field winding 628 is shorted so that it does not contribute to the circuit impedance. The controller 612 sends a signal to the switching circuit 652 at the beginning of cranking, so that the alternator mode can be switched to the induction mode, and field 628 may be shorted via the switch 630. In the induction mode, the alternator 620 receives a PWM input, and by modulating the PWM signal, the speed of rotation of the rotor 626 and torque generated are adjusted. The rotor may be modulated so that the desired torque trajectory is followed, thus achieving variation in alternator torque among plurality of torque levels. By shorting the field winding 628 during engine cranking, the field impedance is substantially eliminated from the alternator circuit. Upon the completion of engine cranking, the alternator 620 is switched to synchronous generation mode, and the switch 630 may be opened so that the filed is not shorted.

Thus, FIG. 6 shows a third method of adjusting torque by adjusting an operating mode of the alternator between an induction mode, and a synchronous mode. The modification of locomotive engine cranking systems as explained in the three embodiments of FIG. 1, FIG. 4, and FIG. 6 may be used independently or in combination. Additionally, such approaches may be applied to retrofit existing locomotive engines.

FIG. 7 depicts an example process flow for the engine cranking system of FIG. 6. At 710, the controller 612 determines whether the engine is in a starting mode, such as a cranking mode. For example, the engine may be already running, or it may be shut down. In one example, when engine is running, the traction inverter 118 may be connected to AC traction motor 148. Further, field resistance 628 may be kept open, and the alternator may be switched to synchronous mode of operation.

At 712, various operating conditions may be determined. Operating conditions may include, but are not limited to, one or more of the following: battery system conditions (voltage, current load, temperature), alternator characteristics, engine ratings (e.g., HP rating, rated engine speed), number of cylinders, fuel type, engine operating conditions (engine speed, engine airflow, engine temperature), environmental conditions, and/or system aging.

At 714, desired alternator torque is determined. For example, the desired level of alternator torque may be based on the engine speed, battery voltage, and number of cylinders. In one example, the routine may utilize a desired engine speed trajectory during cranking and run-up, and based on an error between the desired trajectory and the actual engine speed trajectory, a desired torque may be evaluated.

At 716, the switching circuit is adjusted to connect corresponding components to the alternator 620. In one example, when engine 614 is in the cranking mode, controller 612 may send out signal(s) to the switching circuit 652 to connect the traction inverter 118 to the alternator 120 of the cranking circuit, to short the field resistance 628, and to switch alternator 620 to induction mode of operation.

At 718, engine cranking is commenced. For example, the controller adjusts a PWM signal to the alternator; thereby adjusting the magnetic field generated at the armature windings 624, and thus the alternator torque 622.

At 720, a RPM check is performed. In one example, if engine speed has reached a predetermined speed, for example about 200 rpm, the routine determines that the engine 614 has completed cranking and the alternator torque supplied to the engine 614 may be reduced. If the engine speed is below the predetermined speed, then the engine cranking may continue as explained in block 718.

At 722, voltage at the alternator is reduced. For example, once cranking is complete, power supply from battery is shut down. Further, alternator torque may not be generated, and the alternator may be switched to a generating mode.

At 724, the traction inverter 118 may be connected to the AC traction motor 148, and the contact 630 may be opened. For example, when engine cranking is complete, switching circuit may control the traction inverter 118, and contact 630 is opened so that field impedance is not shunted. As such, the alternator is switched to the synchronous mode.

Thus, FIG. 7 shows an example process flow for engine cranking operation where the alternator is operated as an induction machine, and alternator torque is repeatedly and/or continuously adjusted in real-time to improve engine cranking operation.

FIG. 8 shows a fourth embodiment of an engine cranking system 800 of a locomotive 80. In this embodiment, a method is described for controlling the engine at a plurality of torque levels by providing a separate excitation system for an alternator field winding 826. Specifically, FIG. 8 shows a system similar to that of FIG. 1, including the battery 116, the traction inverter 118 with the IGBTs, the AC traction motor 148, and the engine 114. FIG. 8 additionally includes an alternator 820 with an armature 822, a rotor 824, and a field 826, a switching circuit 852, a controller 812, a resistor 840, a contact 842, a chopper/inverter (also referred to as "chopper") 830 with a pair of IGBTs 832 and 834.

The switching circuit may be similar to the switching circuit 152 of FIG. 1, and the controller 612 may be similar to the controller 112 of FIG. 1. In one example, the controller and the switching circuit, as shown in FIG. 1, may couple the traction inverter to the battery and to the alternator during engine cranking operation. During other operating conditions, for example, after engine cranking, the controller and the switching circuit may couple the traction inverter to the AC traction motor. In another example, the controller and the switching circuit may couple the chopper 830 to the battery and to the field winding 826 during engine cranking operation, and couple the chopper to another component 850 after cranking. The other component 850 may be one of a radiator fan, an air compressor, a battery charger, a traction field regulator, or an AC traction motor.

The alternator 820 may be similar to the alternator 120 of FIG. 1. In one example, when the engine 114 is not cranking, an armature 822 of an alternator 820 is connected in series with the field 826, as shown in FIG. 1. In another example, when the engine is in the cranking mode of operation, the field winding may not be in series with the armature; the field winding may be coupled to the chopper, which may separately excite the field as desired. In this manner, by decoupling the field from the armature, alternator load current may be adjusted so that a plurality of torque levels may be generated at the alternator.

The chopper 830 may be selectively coupled to either the cranking circuit or to the other component 850 based on engine operating conditions. In one example, during an engine cranking condition, the chopper 830 may be coupled to the battery 116 and the field winding 826 of the cranking circuit. The chopper may be one leg of a traction inverter made of a pair of IGBTs, or it may be an inverter or any other type of transistor, which converts the battery DC to the AC input of the field. The current drawn by the chopper from the battery depends on the current required by the field to generate a desired torque at the alternator. In one example, by modulating the PWM signal of the IGBTs 832 and 834 of the chopper 830, modulation in the field current levels may be realized, and consequently a plurality of torque levels may be generated at the alternator.

A resistor 840 may be included in the cranking circuit coupled to the traction inverter, which may be kept open or closed by a contact 842 based on the engine operating conditions. In one example, during an engine cranking condition, the contact 842 may be kept open, and the resistor 840 may be decoupled from the circuit. In this way, the overall circuit resistance may be lowered during the engine cranking.

Referring back to FIG. 8, in one example, the field may not be connected to any other component including the armature, a resistor, or an IGBT. Further, the entire field impedance may contribute to a part of the overall circuit impedance. In other embodiments, not shown in FIG. 8, the field may be shunted with a resistor/contactor (e.g., FIG. 4), or continuous field shunting may be achieved with an IGBT (e.g., FIG. 1).

In this manner, separate excitation of the field winding of the alternator via the chopper enables the generation of a plurality of torque levels at the alternator during engine cranking. The chopper and the traction inverter provides for two separate current sources to the field and to the armature respectively. In one example, since the current sources are independent the field current may be made higher than the armature current, or vice-versa, depending on the desired output torque.

Referring to FIG. 9, it depicts an example process flow for the engine cranking system of FIG. 8. At 910, the controller 812 determines whether the engine is in a starting mode, such as a cranking mode. For example, the engine may be already running, or it may be shut down. In one example, when engine is running, the routine continues to 926, where the traction inverter 118 is connected to AC traction motor 148. Further, field resistance 826 is coupled to the armature 822, the chopper 830 is coupled to the other component 850, and the contact 842 is closed.

When the engine is in the cranking mode, the routine continues to 912. At 912, the switching circuit 852 adjusts the various components so that the chopper 830 is coupled to the field 826 and the battery 116, the field 826 is not coupled in series with the armature, the traction inverter 118 is coupled to the battery 116 and the alternator, and the resistor 840 is opened.

At 914, various operating conditions may be determined. Operating conditions may include, but are not limited to, one or more of the following: battery system conditions (voltage, current load, temperature), alternator characteristics, engine ratings (e.g., HP rating, rated engine speed), number of cylinders, fuel type, engine operating conditions (engine speed, engine airflow, engine temperature), environmental conditions, and/or system aging.

At 916, desired alternator torque and current is determined. For example, the desired alternator torque may be based on the engine speed, battery voltage, and number of cylinders. In one example, the routine may utilize a desired engine speed trajectory during cranking and run-up, and based on an error between the desired trajectory and the actual engine speed trajectory, a desired torque may be evaluated. Further, a field current required to generate the desired torque may be evaluated.

At 918, the desired current as evaluated at 916 may be supplied to the field. In an example, the chopper 830, which is coupled to the field winding separately, draws the desired current from the battery 116 and excites the field 826. The IGBTs of the chopper may modulate the current level based on the changing desired torque level. In this manner, the field may be separately excited independent of the armature of the alternator.

At 920, engine cranking is commenced. For example, the controller adjusts a PWM signal to the chopper; thereby adjusting the current supplied to excite the field winding, thereby achieving the desired variation in the alternator torque.

At 922, a RPM check is performed. In one example, if the engine speed has reached a predetermined value, for example about 200 rpm, it is indicated to the controller that the engine 114 has completed cranking and the alternator torque supplied to the engine 114 may be reduced. If the engine speed is below the predetermined speed, then the engine cranking may continue as explained in block 920.

At 924, voltage at the alternator is reduced. For example, once cranking is complete, power supply from battery is shut down. Further, alternator torque may not be generated, and the alternator may be switched to a generating mode.

At 926, upon the completion of cranking, the traction inverter 118 is connected to the AC traction motor 148, the chopper is connected to the other component 850, the field is connected in series with the armature, and the switch 842 is closed. In this way, the alternator torque may be reduced, the alternator may switch to a synchronous generator, and the engine speed may be stabilized.

Thus, FIG. 9 shows an example process flow for an engine cranking operation where the field is separately excited by the chopper, and alternator torque is repeatedly and/or continuously adjusted in real-time to improve engine cranking operation.

Note that the example control and estimation routines included herein can be used with various engine and/or locomotive system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system, which may include a computer control system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of operating a starting system coupled to a crankshaft of a vehicle engine, comprising:
during engine starting, adjusting torque supplied by the starting system to the vehicle engine based on operating conditions to provide more than two torque levels, and where the adjusting torque includes adjusting torque supplied via a three-phase alternator in the starting system by continuous adjustment of a field shunting of the three-phase alternator.

2. The method of claim 1, wherein a transistor in parallel with a field winding generates a pulse width modulated signal to continuously shunt the field of the three-phase alternator.

3. The method of claim 1, where the continuous adjustment of field shunting is provided via at least one transistor in parallel to a field winding of the three-phase alternator.

4. The method of claim 3 further comprising, coupling the at least one transistor to the field winding to shunt the field winding during engine starting, and connecting the at least one transistor to at least one other component of a vehicle after engine starting.

5. The method of claim 4, wherein the at least one other component is at least one of a radiator fan, an air compressor, a battery charger, a traction field regulator, or an AC traction motor.

6. The method of claim 1, wherein the adjusting torque includes adjusting torque of the three-phase alternator in the starting system by adjusting DC voltage supplied to an inverter coupled to the three-phase alternator.

7. The method of claim 6, wherein adjusting the DC voltage includes adjusting at least one transistor coupled in parallel to a battery.

8. The method of claim 7, wherein the at least one transistor is coupled to a boosting circuit during engine starting, and is connected to at least one other component of a vehicle after starting.

9. The method of claim 8, wherein the at least one transistor is coupled to an inductor of the boosting circuit.

10. The method of claim 1, wherein the adjusting torque includes adjusting torque supplied by the three-phase alternator operating in an induction mode.

11. The method of claim 10 further comprising, operating the three-phase alternator in a synchronous mode after engine starting.

12. The method of claim 10 further comprising, shorting a field winding of the three-phase alternator to operate the three-phase alternator in the induction mode.

13. The method of claim 12 where shorting the field winding is via a transistor.

14. The method of claim 1, wherein the adjusting torque includes adjusting torque supplied by the three-phase alternator in the starting system via adjusting separate excitation of a field winding of the three-phase alternator.

15. The method of claim 14 further comprising, separately exciting the field winding by actuation of a transistor connected in series to the field winding.

16. The method of claim 15 further comprising, coupling the transistor to the field winding during engine starting, and coupling the transistor to at least one other component of a vehicle after engine starting.

17. A method of operating a three-phase alternator of a locomotive engine, the three-phase alternator having a field winding, comprising:
during a first engine condition including engine starting, coupling a transistor in parallel to the field winding, and adjusting alternator torque supplied to the locomotive engine to provide more than two torque levels by repeatedly adjusting shunting of the field winding, the field winding adjusted via modulation of the transistor; and
during a second engine condition after starting, coupling the transistor to a locomotive component other than the field winding, and controlling operation of the locomotive component by adjusting the transistor.

18. The method of claim 17, where the locomotive component includes at least one of a radiator fan, an air compressor, a battery charger, a traction field regulator, or an AC traction motor, and where the field winding is adjusted via pulse width modulation of the transistor.

19. A system for a locomotive, comprising:
an engine;
an AC traction motor including a traction inverter;
a DC battery coupled to the traction inverter;
an alternator including an armature, rotor, and a field winding;
a switching circuit;
a transistor;
a locomotive component; and
a controller for adjusting torque supplied to the engine during engine cranking, the controller operating the switching circuit to couple the transistor to the field winding in parallel and adjusting shunting of the field winding continuously during engine cranking responsive to operating conditions to adjust alternator torque supplied to the engine; and the controller operating the switching circuit to couple the transistor to the locomotive component after engine starting during selected operating conditions to control operation of the locomotive component.

20. The system of claim 19, where the controller adjusts a field shunting in real-time responsive to a desired engine speed starting profile, and wherein the locomotive component is at least one of a radiator fan, an air compressor, a battery charger, a traction field regulator, or an AC traction motor.

* * * * *